United States Patent [19]

Tanaka et al.

[11] Patent Number: 5,339,448
[45] Date of Patent: Aug. 16, 1994

[54] MICROPROCESSOR WITH IMPROVED INTERNAL TRANSMISSION

[75] Inventors: Shigeya Tanaka; Masahiro Iwamura; Tatsumi Yamauchi, all of Hitachi; Tatsuo Nojiri, Takasaki; Hisashi Tada, Hitachi; Tetsuo Nakano, Oume, all of Japan

[73] Assignee: Hitachi, Ltd., Tokyo, Japan

[21] Appl. No.: 15,296

[22] Filed: Jan. 22, 1993

Related U.S. Application Data

[63] Continuation of Ser. No. 387,225, Jul. 28, 1989, abandoned.

[30] Foreign Application Priority Data

Jul. 28, 1988 [JP] Japan .................................. 63-188857

[51] Int. Cl.$^5$ ............................................ G06F 13/38
[52] U.S. Cl. .................... 395/775; 364/DIG. 1; 364/232.8; 364/239.1; 364/240.2; 364/247.4; 364/239.4
[58] Field of Search ................ 364/DIG. 1; 395/325, 395/775, 425; 365/230.02

[56] References Cited

U.S. PATENT DOCUMENTS

| | | | |
|---|---|---|---|
| 4,107,773 | 8/1978 | Gilbreath | 395/775 |
| 4,196,363 | 4/1980 | Malaviya | 307/362 |
| 4,322,794 | 3/1982 | Kurakake | 395/275 |
| 4,633,431 | 12/1986 | Bar | 395/325 |
| 4,794,524 | 12/1988 | Carberry et al. | 395/325 |
| 4,807,112 | 2/1989 | Hamasaki | 395/425 |
| 4,837,743 | 6/1989 | Chiu | 365/230.02 X |
| 4,912,636 | 3/1990 | Magar et al. | 395/425 |
| 5,070,473 | 12/1991 | Takano | 395/725 |
| 5,088,023 | 2/1992 | Nakamura et al. | 395/425 |

*Primary Examiner*—Debra A. Chun
*Attorney, Agent, or Firm*—Kenyon & Kenyon

[57] ABSTRACT

A microprocessor according to the present invention comprises a sub-read bus, to which output terminals of registers of a register file of the microprocessor are coupled. The sub-read bus is in turn coupled to a main read bus of the microprocessor through a bus output circuit. Upon occurrence of a read access to any of the registers, the bus output circuit couples the sub-read bus with the main read bus, whereby data read out from the registers to the sub-read bus are transmitted to the main read bus, and under no existence of the read access, the bus output circuit interrupts the data transmission from the sub-read bus to the main read bus. With this, a load capacitance of the read bus is reduced. As a result, a time for making access to the read bus is much improved.

16 Claims, 9 Drawing Sheets

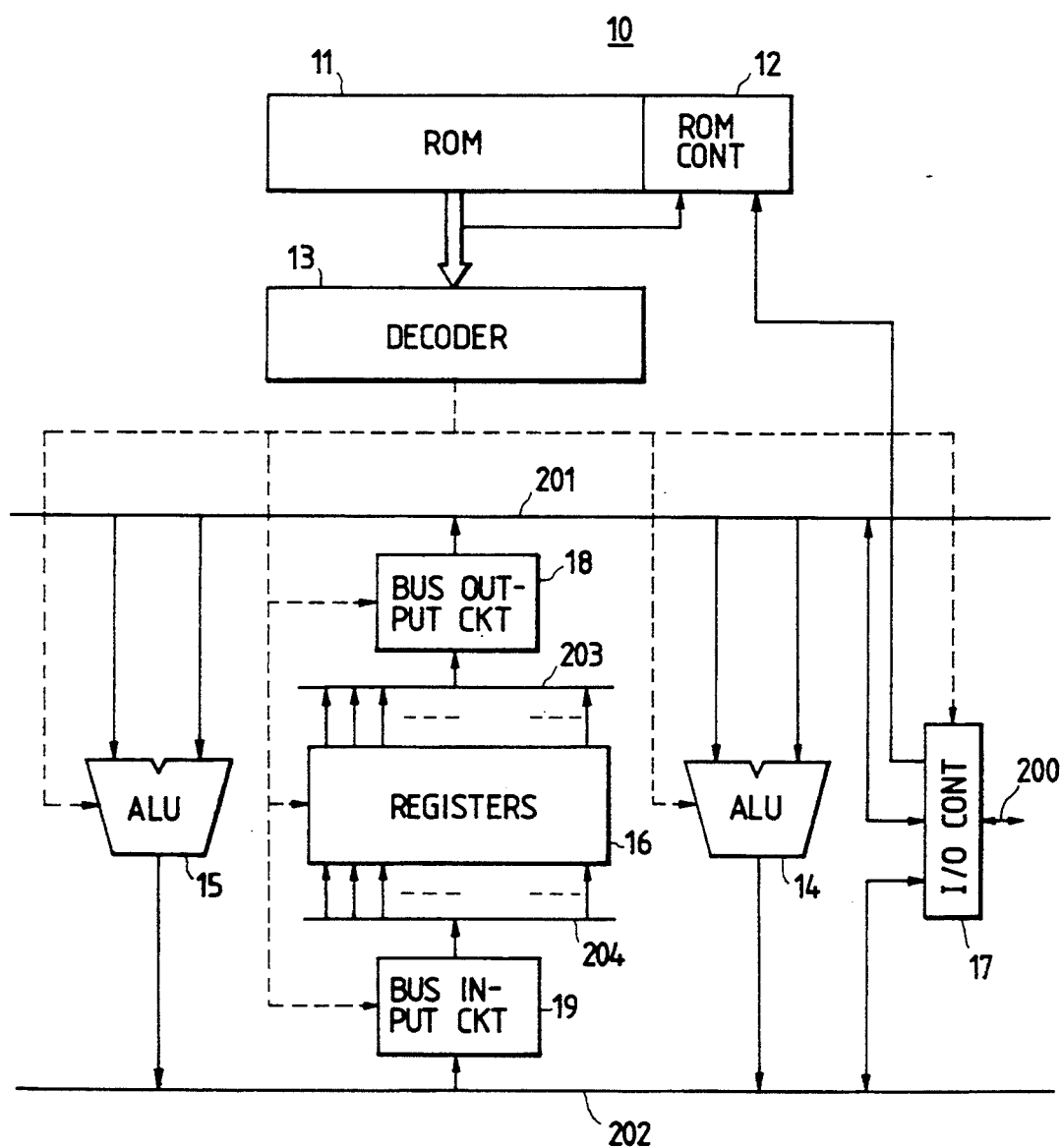

"0"

"1"

MICROPROCESSOR WITH IMPROVED INTERNAL TRANSMISSION

This application is a continuation of application Ser. No. 07/387,225 filed on Jul. 28, 1989, now abandoned.

BACKGROUND OF THE INVENTION

1. Field of the invention

The present invention relates to a microprocessor with an improved access time to buses.

2. Description of the related art

As is well known, a microprocessor, formed on a single semiconductor chip, usually comprises an instruction unit for producing various control signals, a register file consisting of plural registers, an operation unit and an input/output (I/O) controller.

The instruction unit includes a read-only memory (ROM), a ROM controller and a decoder. Microinstructions stored in the ROM are successively read out under the control of the ROM controller and decoded by the decoder, whereby various control signals are generated. In response to the thus generated control signals, the operation unit executes a predetermined operational processing and carries out the data communication with the register file. Data and variables necessary for the operational processing as well as a result of the operational processing are input from or output to external resources through the I/O controller. Also instructions for controlling the ROM controller are supplied, for example, from an external memory through the I/O controller.

The operating unit, the register file and the I/O controller are coupled with each other through a read bus and a write bus. In response to a write access signal from the instruction unit, data from the operation unit are stored in the register file through the write bus, and in response to a read access signal from the instruction unit, data stored in the register file are transmitted to the operation unit through the read bus. Data communication between the register file, the operation unit and external resources is carried out through the read and write buses, too.

A microprocessor is increasingly required to have higher performance. Accordingly, the number of registers of a register file may be remarkably increased. Namely, a number of registers coupled to read and write buses increases, with the result that the load capacitance of the read and write buses becomes large. This causes the prolongation of a time necessary for making access to the read or write buses.

Since output terminals of all registers of a register file and input terminals of an operation unit and an I/O controller are coupled to a read bus in parallel with each other, the load capacitance of the read bus amounts to the sum of the capacitance of wiring of the read bus, output capacity of the registers, and input capacitance of the operation unit and the I/O controller.

Among these capacity, the output capacitance of the registers becomes large with an increase of the number of the registers coupled to the read bus. Further, those capacitances are always coupled to the read bus and function as the load capacitance of the read bus, even when there is no need to make access to the registers. The same is applied to the write bus.

Therefore, even in the case where there occurs the need to make access to a read or write bus to communicate data between an operation unit and an external memory, the access time thereto is affected by the load capacitance of the read or write bus. As a result, there exists a problem that high speed access to the read or write bus becomes impossible.

SUMMARY OF THE INVENTION

The present invention provides a microprocessor, in which the load capacitance of a read and/or write bus coupled to an operation unit of the microprocessor is reduced, whereby high speed access to the read and/or write bus can be achieved.

A feature of the present invention resides in a microprocessor including: an instruction means for generating various control signals necessary for controlling the operation of the microprocessor; an operation unit for executing a predetermined operational processing on the basis of data supplied thereto in response to the control signals generated by the instruction means; a storage means for storing various data used in the operational processing and resultant data of the operational processing; and a bus means, including a read bus and a write bus, through which data communication is carried out in response to read and write access signals generated by the instruction means. The microprocessor further includes at least one of a sub-read bus (i.e., auxiliary read bus) coupled to output terminals of the storage means and a sub-write bus (i.e., auxiliary write bus); coupled to input terminals of the storage means; and a bus output circuit and a bus input circuit for coupling the sub-read bus and the sub-write bus with the read bus and the write bus in response to the read access signal and the write access signal, respectively.

According to a principal feature of the present invention as described above, only when a read or write access to storage means occurs, a bus output circuit and a bus input circuit electrically couples a sub-read bus and a sub-write bus to a read bus and a write bus, respectively. Unless there occurs such an access, the storage means is never coupled to the read or write bus, so that the storage means never functions as part of the load capacity of the read or write bus. As a result, data can be communicated, for example, between an operation unit and an external memory through the read or write bus with a very small access time.

Further, according to another feature of the present invention, there is provided read bus level conversion means between a sub-read bus and a corresponding bus output circuit, by which a voltage level of a data signal on the sub-read bus can be reduced. With this, a time necessary for making access to the sub-read bus from the storage means is shortened, whereby the total access time is further improved.

BRIEF DESCRIPTION OF THE DRAWINGS

FIG. 1 is a block diagram schematically showing an overall configuration of a microprocessor according to an embodiment of the present invention.

FIGS. 4a and 4b show examples of a circuit arrangement of a clocked inverter used in the bus output circuit as shown in FIG. 3a.

DETAILED DESCRIPTION

Figure 2A:
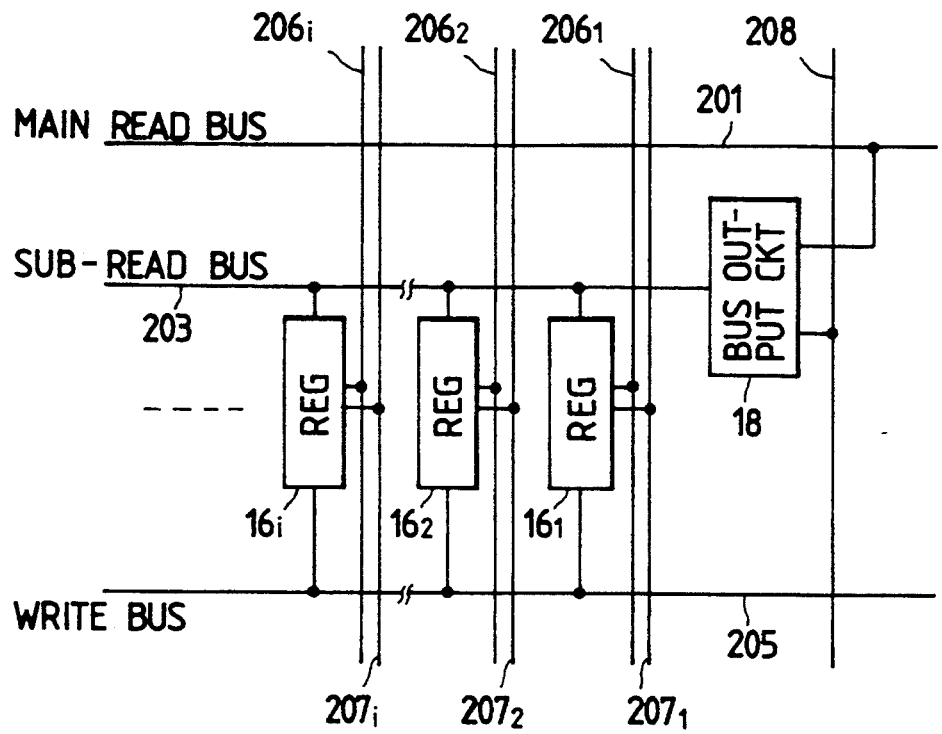
FIGS. 2a to 2c schematically show a part of a detailed configuration of variations of the embodiment as shown in FIG. 1.

In the following, description will be made of embodiments of the present invention, with reference to accompanying drawings.

Referring at first to FIG. 1, there is shown an overall configuration of a microprocessor according to an embodiment of the present invention, in which a microprocessor, generally denoted by reference numeral 10, comprises a read-only memory (ROM) 11, a ROM controller 12, a decoder 13, arithmetic logic units (ALUs) 14, 15, a register file consisting of a group of registers 16, and an input/output (I/O) controller 17. The ALUs 14 and 15 are devoted to execute the calculation of data and the address calculation, respectively, whereby the total processing speed of the microprocessor 10 is much improved. The configuration of a microprocessor itself, as described above, is already known well.

Usually, the microprocessor 10 as described above forms a data processing system for performing a desired task, coupled with an external memory (not shown), in which programs for the task to be executed by the microprocessor and various constants and data necessary for the execution of the programs are stored, and other necessary resources. Instructions constituting the programs are successively read out from the external memory coupled to the microprocessor 10 through a line 200, and the microprocessor 10 executes the instructions, whereby the data processing system achieves a desired data processing.

The ROM 11, the ROM controller 12 and the decoder 13 constitute an instruction unit of the microprocessor 10. Microinstructions stored in the ROM 11 are successively read out in response to an instruction applied to the ROM controller 12 from the external memory and a microinstruction precedingly read out from the ROM 11. The decoder 13 decodes the thus read out microinstructions to produce various control signals, which are applied to various components of the microprocessor 10, as shown by broken lines in the figure.

The ALUs 14, 15 constitute an operation unit of the microprocessor 10. Data input terminals of the respective ALUs 14, 15 are coupled with a main read bus 201, and data of the main read bus 201 are taken therein as data to be processed in response to a control signal from the decoder 13. Data output terminals of the respective ALUs 14, 15 are coupled with a main write bus 202, and a result of the calculation therein is output to the main write bus 202 in response to a control signal from the decoder 13.

In this embodiment, the register file 16 is provided with 64 individual 32-bit-registers, output terminals of which are coupled to a sub-read bus 203. Data stored in the respective registers 16 are read out to the sub-read bus 203 in response to a read access signal from the decoder 13. The sub-read bus 203 is in turn coupled to the main read bus 201 through a bus output circuit 18.

The bus output circuit 18 forms a path of read data, through which data are communicated between the sub-read bus 203 and the main read bus 201. Namely, when a read access signal is applied thereto from the decoder 13, the circuit 18 transmits data of the sub-read bus 203 to the main read bus 201. Otherwise, the path is made open, whereby the data transmission from the sub-read bus 203 to the main read bus 201 is interrupted.

Input terminals of the registers 16 are coupled to a sub-write bus 204, whereby data of the sub-write bus 204 are taken in the registers 16 in response to a write access signal from the decoder 13. The sub-write bus 204 is in turn coupled to the main write bus 202 through a bus input circuit 19.

The bus input circuit 19 forms a path of write data, through which data communication is carried out between the main write bus 202 and the sub-write bus 204. Namely, when a write access signal is applied thereto from the decoder 13, the circuit 19 transmits data of the main write bus 202 to the sub-write bus 204, and otherwise, the path is opened so that the data transmission from the bus 202 to the bus 204 is interrupted.

As described above, the sub-read bus 203 and the sub-write bus 204 are electrically coupled to the main read bus 201 or the main write bus 202, respectively, only when a read or write access to the registers 16 is made. When there is no read or write access to any of the registers 16, all the registers 16 are electrically separated from the main read bus 201 and the main write bus 202, whereby the load capacitances of the main buses 201 and 202 are remarkably reduced.

Accordingly, the ALU 14 or 15 can carry out the data communication with an external memory through the I/O controller 17 as well as the main read bus 201 or the main write bus 202 at a very high speed, due to the reduction of the load capacitance of the main buses 201 and 202.

In the following, some variations of the embodiment as mentioned above will be explained, with reference to FIGS. 2a to 2c. Further, in the following explanation, details of principle parts of the embodiment as shown in FIG. 1 will be made clearer and more concrete, too.

FIG. 2a shows a part of a detailed configuration of a first variation, in which only the sub-read bus 203 is provided and the sub-write bus 204 is omitted. This variation is suited for such a case that the high speed read access is required in a so-called pipeline processing, because the load capacitance of the main read bus 201 can be reduced. It is determined in accordance with the system architecture of a data processing system that either or both of the sub-read bus 203 and the sub-write bus 204 are to be provided.

As shown in the figure, the output terminals of the registers $16_1, 16_2, \ldots, 16_i$ are coupled to the sub-read bus 203, which is in turn coupled to the main read bus 201 through the bus output circuit 18. On the other hand, the input terminals of the registers $16_1, 16_2, \ldots, 16_i$ are coupled directly to a write bus 205.

The registers $16_1, 16_2, \ldots, 16_i$ are also connected to read control lines $206_1, 206_2, \ldots, 206_i$, through which a read access signal is applied to the respective registers $16_1, 16_2, \ldots, 16_i$ from the decoder 13, and to write control lines $207_1, 207_2, \ldots, 207_i$, through which a write access signal is applied to the respective registers $16_1, 16_2, \ldots, 16_i$ from the decoder 13. The bus output circuit 18 is connected to a read bus control line 208, through which a signal for controlling the operation of the bus output circuit 18 is applied from the decoder 13.

When any of the read control lines $206_1, 206_2, \ldots, 206_i$ is asserted, i.e., a signal of logical one is applied thereto, data stored in a corresponding one of the registers 16 is read out to the sub-read bus 203. Simultaneously therewith, the read bus control line 208 is asserted, too, whereby data read out to the sub-read bus 203 are transmitted to the main read bus 201 through the bus output circuit 18. If any of the write control lines $207_1, 207_2, \ldots, 207_i$ is asserted, data of the write bus 205 are taken in a corresponding one of the registers $16_1, 16_2, \ldots, 16_i$.

As described above, according to this first variation, the sub-read bus 203 is coupled to the main read bus 201, only when a read access to the registers 16 is made. When there is no read access to any of the registers 16, all the registers 16 are electrically separated from the main read bus 201, whereby the load capacitance of the main read bus 201 is remarkably reduced. Accordingly, the ALU 14 or 15 can carry out the data communication with an external memory through the I/O controller 17 and the main read bus 201 at a high speed.

Here, let us briefly discuss the reduction of the load capacitance of the main read bus 201 in this variation. As described above, in this embodiment, 64 of the registers 16 are coupled to the main read bus 201 through the bus output circuit 18. Therefore, when the sub-read bus 203 is electrically separated from the main read bus 201 by the bus output circuit 18, the load capacitance of the main read bus 201 is reduced by 64 times an output capacitance $C_{ro}$ of one register, and increased by an output capacitance $C_{co}$ of the bus output circuit 18. Namely, the load capacitance of the main read bus 201 is reduced by $C_{ro} \times 64 - C_{co}$ as a whole. Since $C_{ro}$ and $C_{co}$ are both of the order of several picofarads, load capacitance of the main read bus 201 is considerably reduced.

Figure 2B:
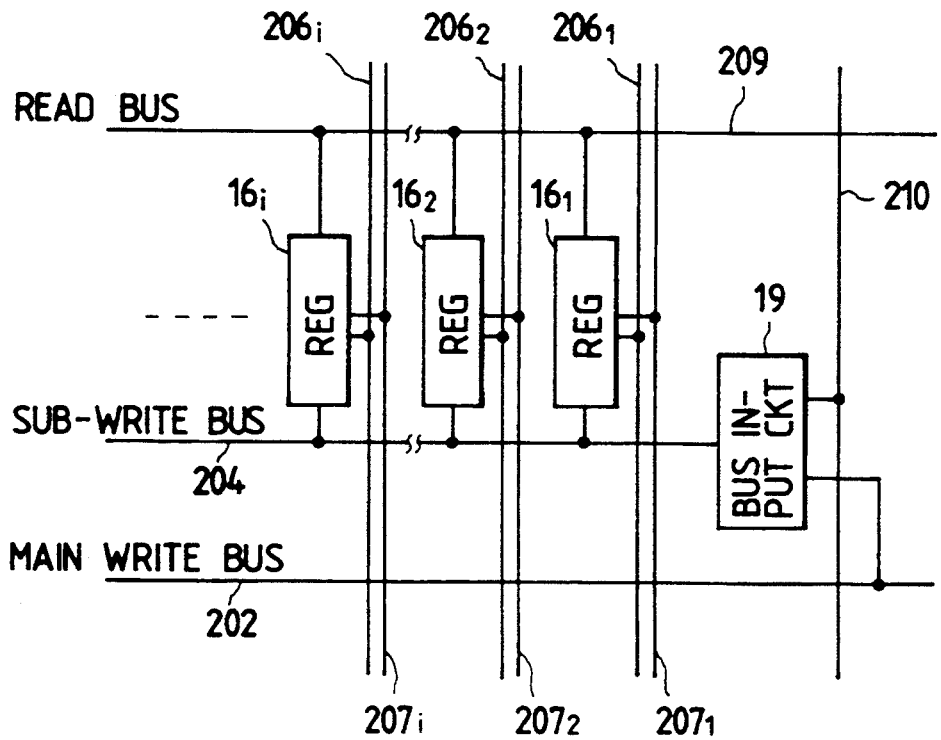

In the case where only the high speed write access is required, only the sub-write bus 204 is provided, as shown in FIG. 2b. In this figure, identical components to those in FIG. 2a are indicated by identical reference numerals. As apparent from the figure, the sub-read bus 203 is omitted, and a single read bus 209 is provided instead of the main read bus 201 and the sub-read bus 203. The sub-write bus 204 is coupled to the main write bus 202 through the bus input circuit 19.

The input terminals of the registers $16_1, 16_2, \ldots, 16_i$ are coupled to the sub-write bus 204, which is in turn coupled to the main write bus 202 through the bus input circuit 19. The output terminals of the registers $16_1, 16_2, \ldots, 16_i$ are coupled directly to the read bus 209. The bus input circuit 19 is connected to a write bus control line 210, through which a signal for controlling the operation of the bus input circuit 19 is applied from the decoder 13.

When the write bus control line 210 is asserted, data of the main write bus 202 are transmitted to the sub-write bus 204 through the bus input circuit 19. Simultaneously with this, any of the write control lines $207_1, 207_2, \ldots, 207_i$ is asserted, and therefore, the data of the sub-write bus 204 are taken in a corresponding one of the registers $16_1, 16_2, \ldots, 16_i$.

Also in this second variation, analogous to the previous discussion of the reduction of the load capacitance of the main read bus 201 in the first variation, the load capacitance of the write bus 202 is reduced. Namely, assuming that there are provided 64 of the registers 16, the load capacitance of the main write bus 202 is reduced by $C_{ri} \times 64 - C_{ci}$, when the sub-write bus 204 is electrically separated from the main write bus 202 by the bus input circuit 19, wherein $C_{ri}$ denotes an input capacitance of one register and $C_{ci}$ an input capacitance of the bus input circuit 19. Since also $C_{ri}$ and $C_{ci}$ are of the order of several pico-farads and almost equal to each other, the load capacitance of the main write bus 22 is considerably reduced.

Figure 2C:
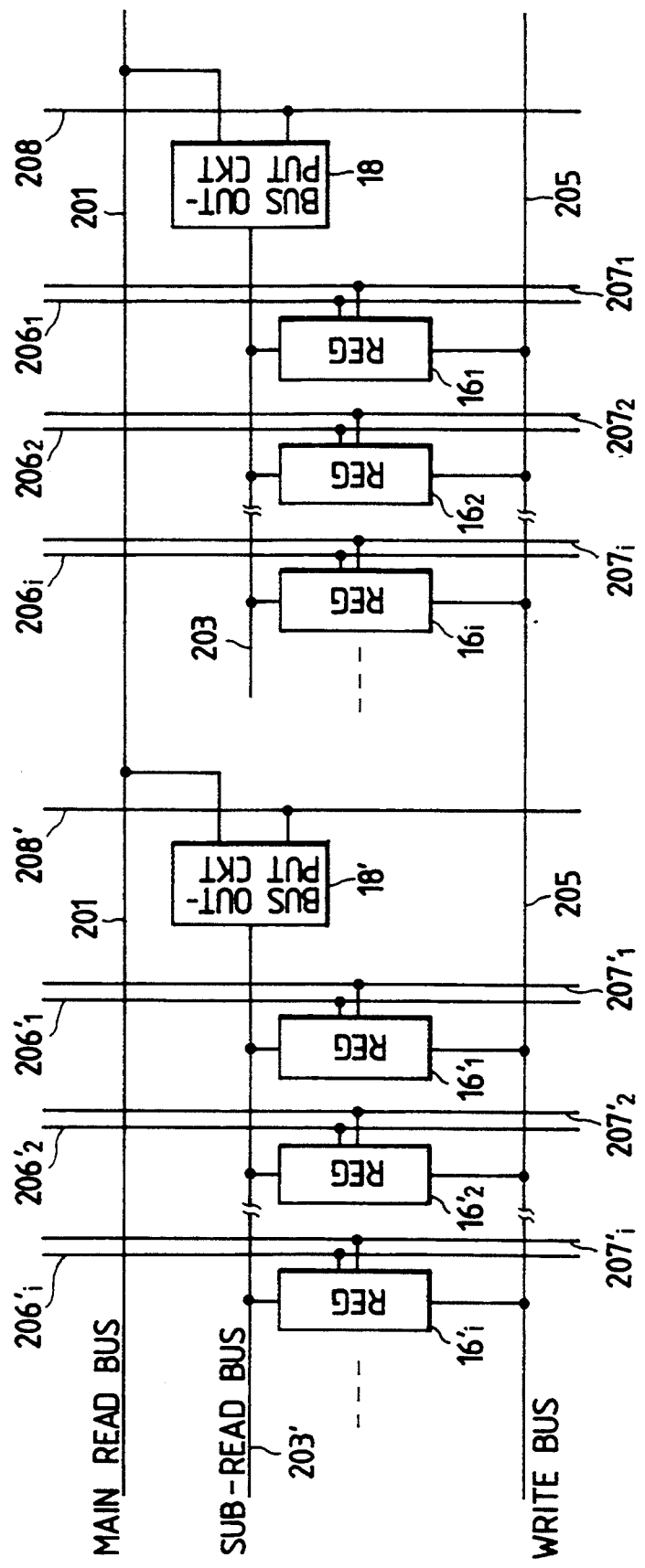

If a number of the registers 16 coupled to the sub-read bus 203 and/or the sub-write bus 204 further increases, an access time to the sub-read bus 203 or the sub-write bus 204 becomes large, because of the load capacitance thereof increases. In such a case, the registers are divided into plural groups, and sub-read buses and/or sub-write buses are provided for every group of the registers. FIG. 2c shows an example of a third variation of the embodiment.

In this variation, the registers 16 are divided into two groups, i.e., one of the groups consisting of the registers $16_1, 16_2, \ldots, 16_i$ and the other group of the registers $16_1', 16_2', \ldots, 16_i'$. The output terminals of the registers of the respective groups are coupled to the corresponding sub-read buses 203 and 203', which are both coupled to the main read bus 201 through the bus output circuits 18 and 18', respectively.

The operation of the third variation as shown in FIG. 2c is the same as that of FIG. 2a, and therefore, the detailed description thereof is omitted here. Further, it will be easily understood that the same can be applied to the provision of plural sub-write buses in the case of FIG. 2b.

In the following, details of the bus output circuit 18 and the bus input circuit 19 will be explained. Both the circuits 18 and 19 have the same circuit configuration, and are different from each other only in the control signal applied thereto, i.e., a read bus control signal is applied to the former and a write bus control signal to the latter. Accordingly, the description here will be based mainly on the bus output circuit 18, any difference relative to the bus input circuit 19 being described as needed.

Figure 3A:
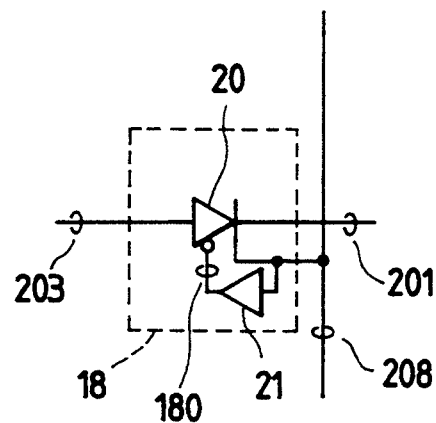
FIGS. 3a to 3c show examples of a circuit arrangement of a bus output circuit used in the above embodiment and its variations.

FIG. 3a shows an example of a circuit arrangement of the bus output circuit 18. In this example, the bus output circuit 18 comprises a clocked inverter 20 and an inverter 21 for controlling the clocked inverter 20. An input terminal of the clocked inverter 20 is coupled to the sub-read bus 203 and an output terminal thereof to the main read bus 201. The output terminal is also coupled to the read bus control line 208, and the inverter 21 is connected across an enabling terminal 180 of the clocked inverter 20 and the read bus control line 208.

In the bus input circuit 19, the input terminal of the clocked inverter 20 is coupled to the main write bus 202 and the output terminal thereof to the sub-write bus 204. A signal applied to the enabling terminal 180 thereof is given through the write bus control line 210.

As is known, a clocked inverter operates in the following manner. If a signal "0" is applied to an enabling terminal of a clocked inverter, an output terminal thereof is maintained at high impedance irrespective of the state of a signal applied to an input terminal thereof. When a signal "1" is applied to the enabling terminal, a signal applied to the input terminal appears at the output terminal with its polarity inverted. Namely, when "0" is applied at the input terminal, "1" appears at the output terminal, and vice versa.

Accordingly, the bus output circuit 18, when the read bus control line 208 is asserted, inverts data supplied through the sub-read bus 203 to output them to the main read bus 201, and when the line 208 is negated, maintains its output terminal at high impedance, whereby the read data path connecting the sub-read bus 203 and the main read bus 201 is interrupted.

Figure 4A:
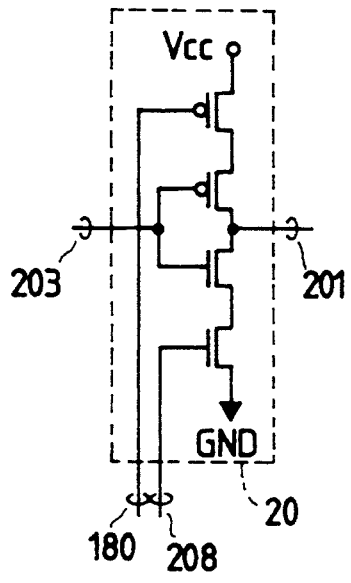
Figure 4B:
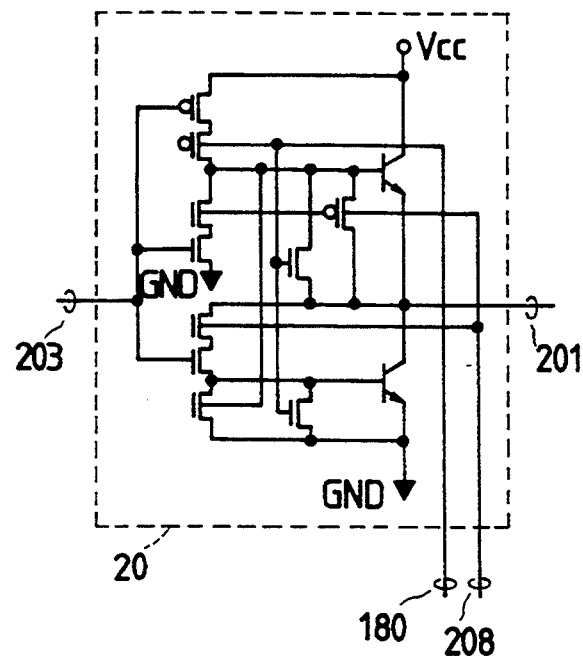

Typical examples of the clocked inverter 20 are shown in FIGS. 4a and 4b. The clocked inverter as shown in FIG. 4a is formed as CMOS type consisting of PMOS transistors and NMOS transistors, and that as shown in FIG. 4b is formed as a so called bi-CMOS type including bipolar transistors as well as PMOS and NMOS transistors. Further, $V_{cc}$ denotes a control voltage source and GND denotes the ground.

Since these circuit arrangements themselves of the clocked inverter 20 are already known, further description thereof will be omitted. In the case where the load capacitance of the main read bus 201 is small, the high speed access can be sufficiently achieved by the clocked inverter as shown in FIG. 4a. If the load capacitance thereof is large, it is preferable to use the clocked inverter as shown in FIG. 4b.

Figure 3B:
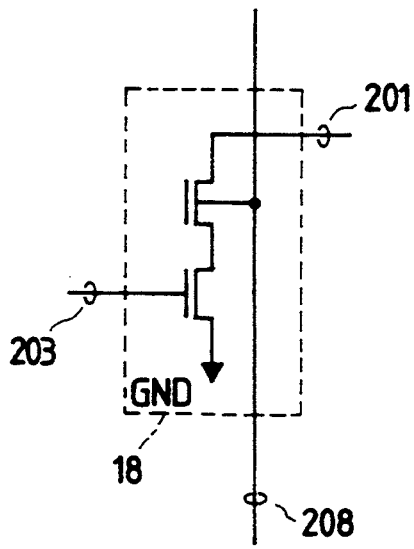
Figure 3C:
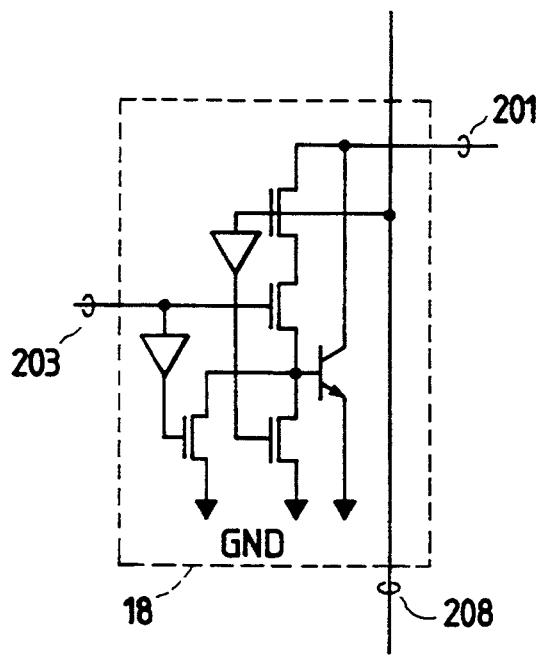

Returning to FIGS. 3b and 3c, there are shown other examples of the bus output circuit 18. The circuit as shown in FIG. 3b is formed by NMOS transistors only, and that as shown in FIG. 3c by NMOS transistors, inverters and bipolar transistors. The bus output circuit 18 as shown in these figures can be used advantageously, when the main read bus 201 is a dynamic bus.

The operation of the bus output circuit 18 as shown in these figures is the same as that as shown in FIG. 3a. Namely, when the read bus control line 208 is asserted, data supplied from the sub-read bus 203 are inverted and outputted to the main read bus 201. When the read bus control line 208 is negated, the output terminal of the bus output circuit 18 is maintained at high impedance.

Next, details of each of the registers 16 will be explained, with reference to FIGS. 5a to 5c. In these figures, there is shown the circuit arrangement of a register, which is used in FIG. 2a. Further, in FIGS. 5a to 5c, the same parts as in FIG. 2a are indicated by the same reference numerals. Since, however, every register $16_1$, $16_2$, ..., $16_i$ has the same structure and one of them is representatively shown in FIGS. 5a to 5c, the register, the read control line and the write control line are indicated by the corresponding reference numerals without suffixes.

Figure 5A:
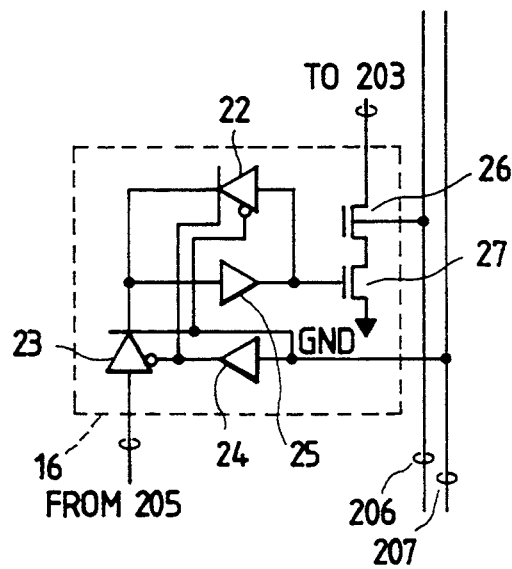
FIGS. 5a to 5c show examples of a circuit arrangement of a register included in the microprocessor of the embodiment.

Referring at first to FIG. 5a, there is shown a first example of the circuit arrangement of the register 16, which comprises clocked inverters 22, 23, inverters 24, 25 for controlling the respective clocked inverters 22, 23, and NMOS transistors 26, 27.

When the write control line 207 is asserted, data supplied from the write bus 205 are taken in the register 16 with their state logically inverted by the clocked inverter 23. The data are kept by the storage function of a logical feedback loop consisting of the clocked inverter 22 and the inverter 25. Therefore, the data taken in the register 16 are stored therein, even after the write control line 207 is negated. When the read control line 206 is asserted, the data kept by the logical feedback loop are outputted to the sub-read bus 203 through the NMOS transistors 26, 27.

Figure 5B:
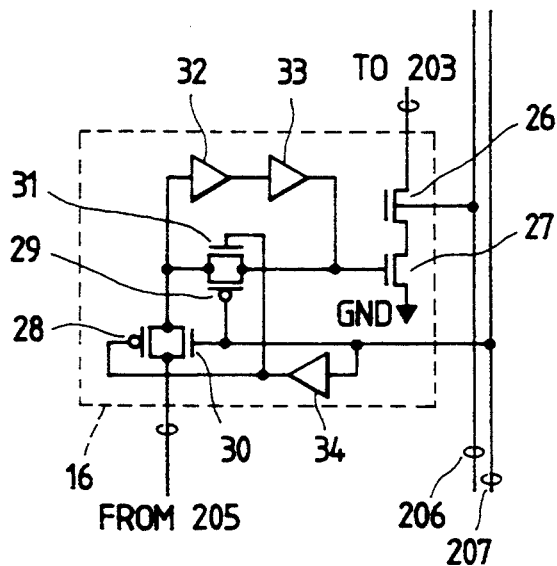

FIG. 5b shows another example, in which the register 16 comprises PMOS transistors 28, 29, NMOS transistors 26, 27, 30, 31, and inverters 32, 33, 34. Further, FIG. 5c shows still another example, in which the register 16 is composed of PMOS transistors 28, 29, NMOS transistors 30, 31, inverters 32, 33, 34, 35 and a clocked inverter 36.

The circuit arrangements of the register 16 as shown in FIGS. 5a and 5b are suited for the case where the sub-read bus 203 is constructed as a dynamic bus. On the other hand, the circuit arrangement as shown in FIG. 5c can be advantageously used in the case where the sub-read bus 203 is of a static type.

In the foregoing, only registers were coupled to the sub-buses. In the present invention, however, what can be coupled to the sub-buses is not limited to registers. In the following, explanation will be made of another embodiment, in which components other than registers are coupled to the sub-buses.

Figure 6:
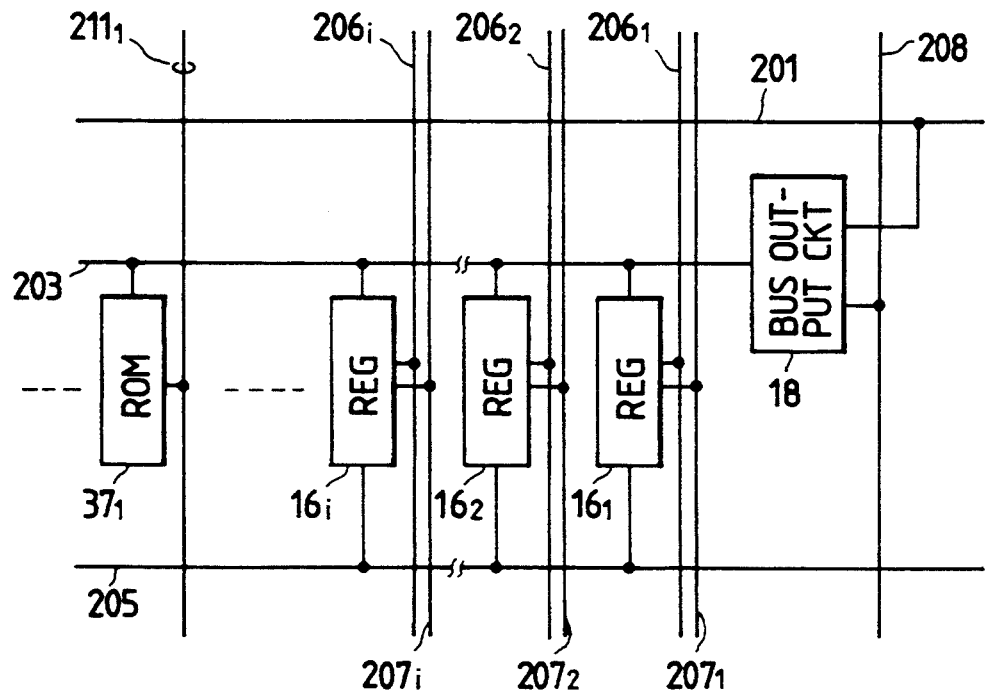
FIG. 6 schematically shows a part of a detailed configuration of another embodiment of the present invention.

FIG. 6 shows a part of a detailed configuration of the another embodiment, in which the same parts as in FIG. 2a are indicated by the same reference numerals. In the embodiment as shown in FIG. 6, ROMs 37 (representatively denoted by ROM $37_1$) are coupled to the sub-read bus 203. Further, a ROM read control line $211_1$ is coupled to the ROM $37_1$, through which a ROM read control signal is applied thereto from the decoder 13.

When the ROM read control line $211_1$ is asserted, data stored in the ROM $37_1$ are read out to the sub-read bus 203. Simultaneously therewith, since the read bus control line 208 is asserted, too, the data read out to the sub-read bus 203 are transmitted to the main read bus 201 through the bus output circuit 18. In this manner, the read operation from the ROMs 37 can be carried out in the same manner as that from the registers 16. Of course, the reading or writing operation of the registers $16_1$, $16_2$, ..., $16_i$ is quite the same as described in the foregoing.

Figure 7A:
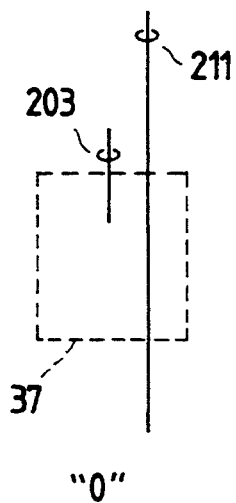
FIGS. 7a and 7b are drawings for explaining the operation of read-only memories provided in the another embodiment as shown in FIG. 6.
Figure 7B:
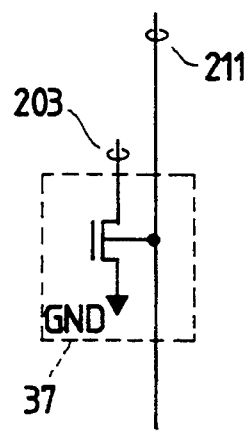

As shown in FIGS. 7a and 7b, a ROM used in this embodiment can be realized by whether or not an NMOS transistor, a gate of which is coupled to the ROM read control line 211, is provided in respective bits of the ROM FIG. 7a illustrates that a certain bit is of "0", since no NMOS transistor is provided in the bit. On the other hand, FIG. 7b illustrates that a certain bit is of "1", since an NMOS transistor is provided. In these ROMs 37, there are stored constants frequently used in common in various types of the calculating operation executed by the ALUs 14, 15; for example, "000 ... 00" or "111 ... 11", namely all bits e.g., 32 bits are of "0" or "1").

FIG. 6 shows an example, in which a microprocessor as shown in FIG. 2a is provided with ROMs for storing fixed data. However, it will be easily understood that such ROMs can be provided also in a microprocessor as shown in FIG. 2c. In this case, ROMs are coupled to either one or both of the sub-read buses 203 and 203'.

Figure 8:
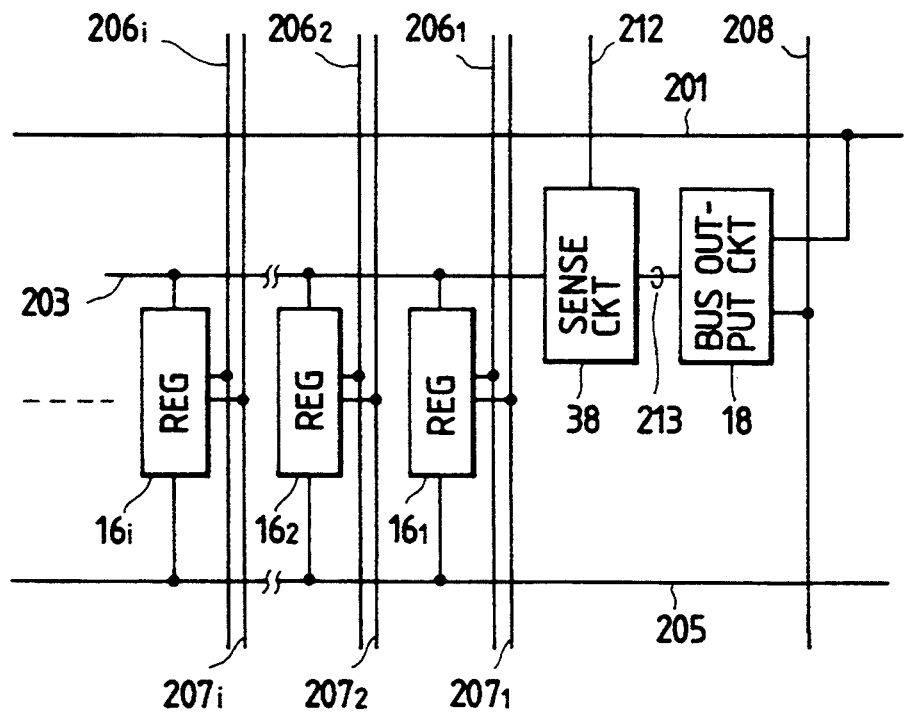
FIG. 8 schematically shows a part of a detailed configuration of still another embodiment of the present invention.

Referring next to FIG. 8, description will be made of still another embodiment, which can further improve the access time to the main read bus 201 from the registers 16 by reducing a voltage level of a data signal of the sub-read bus 203. In the figure, the same parts as in FIG. 2a are indicated by the same reference numerals.

In this embodiment, there is further provided a sense amplifier circuit 38, an input terminal of which is coupled to the sub-read bus 203 and an output terminal thereof to the bus output circuit 18. Further, since it is assumed that the sub-read bus 203 in FIG. 8 is of a dynamic type, a sense circuit control line 212 is coupled to the sense circuit 38 from the decoder 13. The sense circuit control line 212 is asserted in the timing of precharge of the sub-read bus 203 and negated in the timing of discharge thereof.

The circuit 38 amplifies data read out from the registers $16_1, 16_2, \ldots, 16_i$, which are of very low voltage, up to the level, which is high enough to operate the bus output circuit 18 normally. Although the voltage of a data signal is usually set at 5 volts, the voltage of a data signal on the sub-read bus 203 can be reduced down to about 0.7 volts by providing the sense circuit 38, whereby the access time to the main read bus 201 from the registers 16 can be shortened as much.

Figure 9:
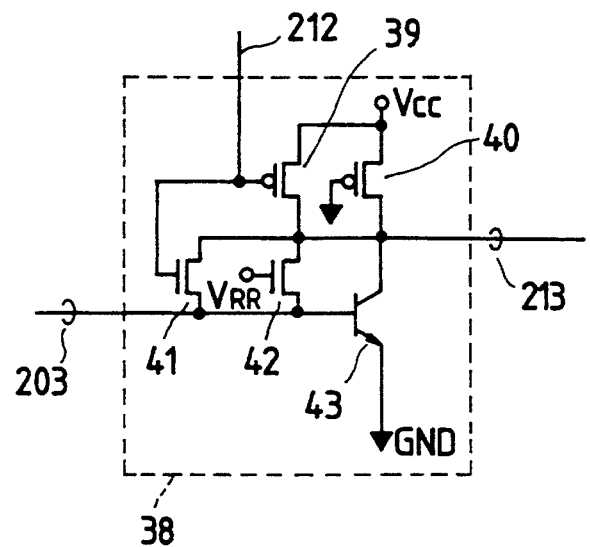
FIG. 9 is a drawing showing an example of a circuit arrangement of a sense circuit used in the embodiment as shown in FIG. 8.

In FIG. 9, there is shown an example of the circuit arrangement of the sense circuit 38. As apparent from the figure, the sense circuit 38 comprises PMOS transistors 39, 40, NMOS transistors 41, 42 and a bipolar transistor 43. A base of the bipolar transistor 43 is coupled to the sub-read bus 203 and a collector thereof to the input terminal of the bus output circuit 18 through a line 213. Gates of the PMOS transistor 39 and the NMOS transistor 41 are coupled to the gate control line 212. The NMOS transistor 42 functions as a resistor with a constant voltage $V_{RR}$ applied to its gate.

The sense circuit 38 as constructed above functions in the following manner. Namely, the circuit 38 logically inverts an input signal to produce an output signal, when the level of the input signal changes from low to high and reaches a semiconductor operating level. On the contrary, when the input signal changes from the high level to the low level and its level reaches the semiconductor operating level, the sense circuit 38 logically inverts the output signal. Accordingly, the voltage level of a data signal of the sub-read bus 203 can be maintained at the semiconductor operating level of about 0.7 volts at maximum. Namely, the circuit 38 functions as means for converting a voltage level of a data signal of the sub-read bus 203.

FIG. 8 shows an example, in which a microprocessor as shown in FIG. 2a is provided with the sense circuit 38 for converting a voltage level of a data signal of the sub-read bus 203. However, it will be easily understood that such a sense circuit can be provided also in a microprocessor as shown in FIG. 2c. In this case, sense circuits are most preferably provided in every sub-read buses 203 and 203'.

Figure 5C:
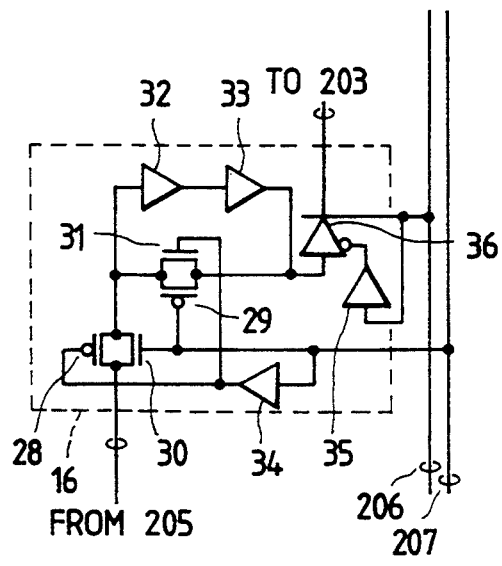
Figure 10:
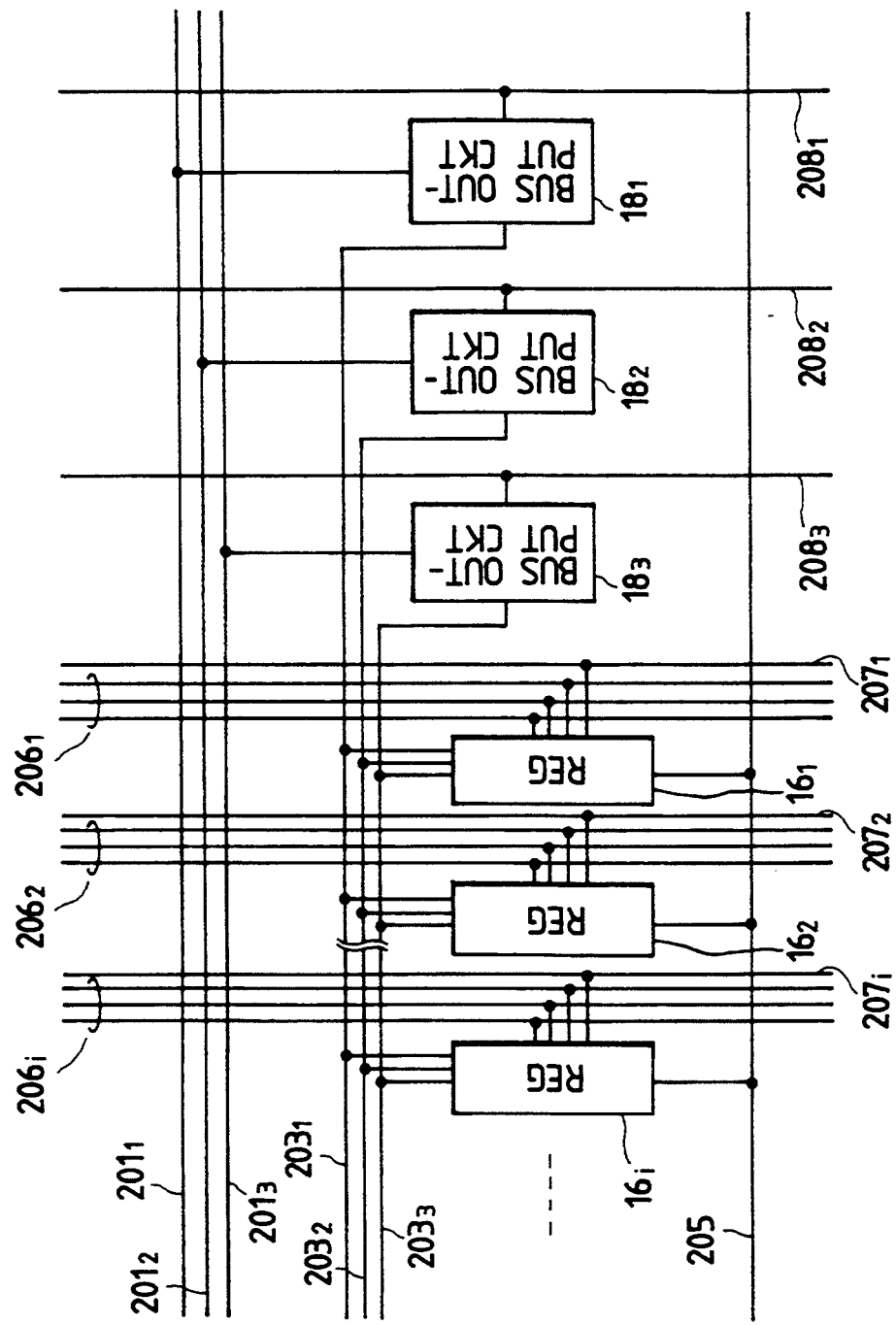
FIG. 10 schematically shows a part of a detailed configuration of further embodiment of the present invention.

In the embodiments as described above, each of the registers 16 has only one data output terminal (cf. FIG. 5a to 5c). The present invention can be applied to the case, too, in which each of the registers 16 has plural data output terminals. In FIG. 10, there is shown a relevant part of a further embodiment, in which each register has three data output terminals. In the figure, the same parts as in FIG. 2a are indicated by the same reference numerals.

As apparent from the figure, since each of the registers $16_1, 16_2, \ldots, 16_i$ has three output terminals, there are provided three sub-read buses 203, which are indicated by the reference numeral 203 with suffixes 1 to 3. Further, to each of the registers $16_1, 16_2, \ldots, 16_i$, there is coupled the read control line $206_1, 206_2, \ldots, 206_i$ from the decoder 13. In this embodiment, however, each read control line $206_1, 206_2, \ldots, 206_i$ consists of three lines, each of which controls the output of data to a corresponding output terminal of the respective registers $16_1, 16_2, \ldots, 16_i$.

To the sub-read buses $203_1, 203_2, 203_3$, there are coupled three bus output circuits $18_1, 18_2, 18_3$ all having the same construction as shown in FIGS. 3a to 3c, which in turn couple the sub-read buses $203_1, 203_2, 203_3$ with main read buses $201_1, 201_2, 201_3$ in response to a control signal supplied from the decoder 13 through a corresponding read bus control line $208_1, 208_2, 208_3$.

The operation of this embodiment is the same as that of the embodiment of FIG. 2, with the exception that the control signal is provided through a corresponding one of the three lines of each read control line $206_1, 206_2, \ldots, 206_i$, in order to control the output of data of the respective registers $16_1, 16_2, \ldots, 16_i$ to the corresponding sub-read buses $203_1, 203_2, 203_3$.

Figure 11:
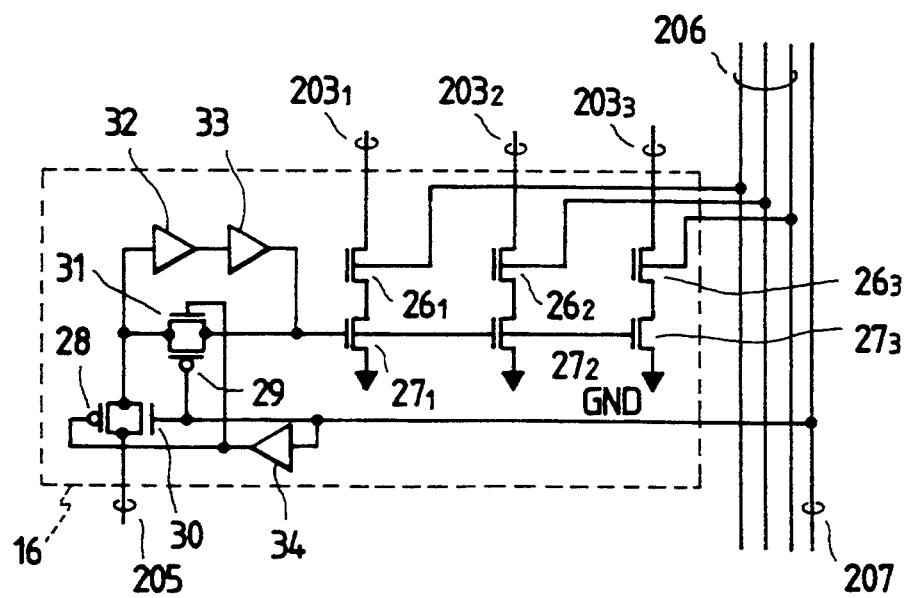
FIG. 11 is a drawing showing an example of a circuit arrangement of a register used in the embodiment as shown in FIG. 10.

In FIG. 11, there is shown an example of a circuit arrangement of the register $16_1, 16_2, \ldots, 16_i$ having three output terminals. It will be apparent from the figure that the circuit arrangement shown is the same in its principle part as that shown in FIG. 5b, except the provision of three output stages each consisting of NMOS transistors $26_1, 27_1$ and $26_2, 27_2$ and $26_3, 27_3$, which are coupled to the sub-read buses $203_1, 203_2, 203_3$, respectively. Each of the output stages is controlled by the control signal applied thereto through a corresponding one of the three lines of the read control lines 206.

Although FIG. 11 shows an example, in which the circuit arrangement of the register 16 as shown in FIG. 5b is modified so as to have three output terminals, it will be easily understood that the same modification can be applied to the circuit arrangements as shown in FIGS. 5a and 5c.

Further, it is of course possible that a microprocessor as shown in FIG. 10 can be provided with a ROM or ROMs as shown in FIG. 6 and sense circuits as shown in FIG. 8. This will be easily understandable, because the configuration as shown in FIG. 10 is almost the same as that shown in FIG. 2, when viewed with respect to one of the output terminals of the registers 16. Namely, ROMs are coupled to at least one of the sub-read buses $203_1, 203_2, 203_3$ in the same manner as shown in FIG. 6, and sense circuits are provided before the respective bus output circuits $18_1, 18_2, 18_3$ in the same manner as shown in FIG. 8.

What is claimed is:

1. A microprocessor comprising:
    means for generating control signals for controlling the operation of the microprocessor in response to an instruction applied to the microprocessor;
    an operation unit adapted to execute a data processing on the basis of data supplied to the microprocessor in accordance with the control signals generated by said means for generating;
    means for storing the data to be processed by said operation unit and a result of the data processing executed by said operation unit;
    a read bus and a write bus coupled to said operation unit to communicate data between said operation unit and said means for storing;
    at least one auxiliary read bus and at least one auxiliary write bus coupled to outputs and inputs of said means for storing, respectively;

at least one bus output circuit and at least one bus input circuit, responsive to the control signals generated by said means for generating, adapted to couple and decouple said at least one auxiliary read bus with and from said read bus and adapted to couple and decouple said at least one auxiliary write bus with and from said write bus, respectively;

wherein said at least one bus output circuit is adapted to decouple said at least one auxiliary read bus from said read bus such that no auxiliary read bus is coupled with said read bus;

wherein said at least one bus input circuit is adapted to decouple said at least one auxiliary write bus from said write bus such that no auxiliary, write bus is coupled with said write bus; and wherein one bus output circuit couples one auxiliary read bus to said read bus only when a read access to said means for storing occurs and one bus input circuit couples one auxiliary write bus to said write bus only when a write access to said means for storing occurs.

2. A microprocessor comprising:

means for generating control signals for controlling the operation of the microprocessor in response to an instruction applied to the microprocessor;

an operation unit adapted to executing a data processing on the basis of data supplied to the microprocessor in accordance with the control signals generated by said means for generating;

means for storing the data to be processed by said operation unit and a result of the data processing executed by said operation unit;

a read bus and a write bus coupled to said operation unit to communicate data between said operation unit and said means for storing;

at least one auxiliary read bus coupled to outputs of said means for storing, inputs of which are coupled to said write bus;

at least one bus output circuit, responsive to the control signals generated by said means for generating, coupling said at least one auxiliary read bus with said read bus only when a read access to said means for storing occurs and decoupling said at least one auxiliary read bus from said read bus;

wherein said at least one bus output circuit is adapted to decouple said at least one auxiliary read bus from said read bus such that no auxiliary read bus is coupled with said read bus.

3. A microprocessor comprising:

means for generating control signals for controlling the operation of the microprocessor in response to an instruction applied to the microprocessor;

an operation unit adapted to execute a data processing on the basis of data supplied to the microprocessor in accordance with the control signals generated by said means for generating;

means for storing the data to be processed by said operation unit and a result of the data processing executed by said operation unit;

a read bus and a write bus coupled to said operation unit to communicate data between said operation unit and said means for storing;

at least one auxiliary write bus coupled to inputs of said means for storing, outputs of which are coupled to said read bus;

at least one bus input circuit, responsive to the control signals generated by said instruction means, coupling said at least one auxiliary write bus with said write bus only when a write access to said means for storing occurs and decoupling said at least one auxiliary write bus from said write bus:

wherein said at least one bus input circuit is adapted to decouple said at least one auxiliary write bus from said write bus such that no auxiliary write bus is coupled with said write bus.

4. A microprocessor as defined in claim 1 or 2, further comprising a read bus level converter between said at least one auxiliary read bus and said at least one bus output circuit, which, when a level of signal input to said level converter from said at least one auxiliary read bus changes from low to high and reaches an operating voltage level of a semiconductor element used in said level converter, produces an output signal changing from a high level to a low level to said at least one bus output circuit, and when the level of the input signal to said level converter changes from high to low and reaches the operating voltage level, produces an input signal changing from the low level to the high level to said at least one bus output circuit.

5. A microprocessor as defined in claim 4, wherein said read bus level converter includes a bi-polar transistor and the operating voltage level is determined by a forward voltage drop across a base and an emitter of the bi-polar transistor.

6. A microprocessor as defined in claim 1 or 2, wherein said means for storing includes a plurality of read-only memories, output terminals of which are coupled to said at least one auxiliary read bus.

7. A microprocessor as defined in claim 1 or 2 wherein said means for storing comprises a plurality of registers, and said plurality of registers is divided into a plurality of groups, each of said groups of registers having a corresponding one of said at least one auxiliary read bus and a corresponding one of said at least one bus output circuit adapted to couple said corresponding one of said at least one auxiliary read bus to said read bus.

8. A microprocessor as defined in claim 7, wherein each of the plural groups of said means for storing is provided with a read bus level converter, said bus level converter producing an output signal changing from a high level to a low level to the associated bus output circuit, when a level of signal input to said level converter from the auxiliary read bus changes from low to high and reaches an operating voltage level of a semiconductor element used in said level converter, and an output signal changing from the low level to the high level to the associated bus output circuit, when the level of the input signal to the level converter changes from high to low and reaches the operating voltage level.

9. A microprocessor as defined in claim 8, wherein each of said read bus level converter includes a bi-polar transistor and the operating voltage level is determined by a forward voltage drop between a base and an emitter of the bi-polar transistor.

10. A microprocessor as defined in claim 7, wherein at least one group of said divided means for storing further includes a read-only memory, output terminals of which are coupled to one of said auxiliary read buses corresponding to the group.

11. A microprocessor as defined in claim 1 or 2, in which said means for storing includes a plurality of registers each having plural output terminals and said read bus comprising a plurality of read buses each having a corresponding one of said at least one auxiliary read bus, each of which is coupled to a corresponding one of the plural output terminals of the registers, and a plurality of said at least one bus output circuit each coupled to one of said at least one auxiliary read bus, by which the auxiliary read buses are separably coupled to the corresponding ones of the plural read buses in response to the control signals.

12. A microprocessor as defined in claim 11, wherein there are provided plural read bus level converters, one converter between each auxiliary read bus and its associated bus output circuit, respectively; each of said bus level converters producing an output signal changing from a high level to a low level to the associated bus output circuit, when a level of signal input to said level converter from the associated auxiliary read bus changes from low to high and reaches an operating voltage level of a semiconductor element used in said level converter, and an output signal changing from the low level to the high level to the associated bus output circuit, when the level of the input signal to the converter changes from high to low and reaches the operating voltage level.

13. A microprocessor as defined in claim 12, wherein each of said read bus level converter means includes a bi-polar transistor and the operating voltage level is determined by a forward voltage drop between a base and an emitter of the bi-polar transistor.

14. A microprocessor as defined in claim 11, further comprising a read-only memory coupled to at least one of the plurality of auxiliary read buses.

15. A microprocessor as defined in claim 1 or 3 wherein said means for storing comprises a plurality of registers and said plurality of registers is divided into a plurality of groups, each of said groups of registers having a corresponding one of said at least one auxiliary write bus coupled thereto and a corresponding one of said at least one bus input circuit adapted to couple said corresponding one of said at least one auxiliary write bus to said write bus.

16. A microprocessor as defined in claims 1, 2, or 3, wherein said microprocessor is provided on a single semiconductor chip.

* * * * *

UNITED STATES PATENT AND TRADEMARK OFFICE
CERTIFICATE OF CORRECTION

PATENT NO. : 5,339,448
DATED : August 16, 1994
INVENTOR(S) : Shigeya Tanaka, et al.

It is certified that error appears in the above-indentified patent and that said Letters Patent is hereby corrected as shown below:

| Column | Line | |
|---|---|---|
| 1 | 60 | After "these" change "capacity" to --capacitances--; after "output" change "capacitance" to --capacity--. |
| 8 | 50 | After "ROM" insert --.--. |
| 9 | 30 | Delete "10". |
| 12 | 4 | Change "bus:" to --bus;--. |
| 14 | 2 | Change "converter means" to --converter--. |

Signed and Sealed this

Twenty-eight Day of February, 1995

Attest:

BRUCE LEHMAN

Attesting Officer    *Commissioner of Patents and Trademarks*